United States Patent Office 3,776,980
Patented Dec. 4, 1973

3,776,980
POLYESTERS OF METHYLCYCLOHEXENE-
DICARBOXYLIC ANHYDRIDE
Frank Scardiglia, Woodcliff Lake, N.J., and Israel J.
Dissen and Takeo Hokama, Chicago, Ill., assignors to
Velsicol Chemical Corporation, Chicago, Ill.
No Drawing. Continuation-in-part of application Ser. No.
33,501, Apr. 30, 1970, now Patent No. 3,663,658. This
application Jan. 17, 1972, Ser. No. 218,471
The portion of the term of the patent subsequent to
May 16, 1990, has been disclaimed
Int. Cl. C08f 21/00, 21/02; C08g 17/12
U.S. Cl. 260—872
9 Claims

ABSTRACT OF THE DISCLOSURE

This invention discloses new air-drying polyester compositions comprising the adduct of maleic acid or anhydride and trans-piperylene; isophthalic acid; an unsaturated dicarboxylic compound selected from the group consisting of maleic acid, maleic anhydride and fumaric acid; and glycol.

---

This application is a continuation-in-part of our co-pending application Ser. No. 33,501, filed Apr. 30, 1970, now issued Pat. 3,663,658.

This invention relates to new polyester compositions and polymerizable compositions theroef which dry rapidly in the presence of air at ambient temperatures. More particularly this invention relates to new linear polyester compositions having as their essential ingredients the adduct of maleic acid or anhydride and transpiperylene.

Ordinarily, polyester-styrene compositions in thin sections, such as coatings will not cure satisfactorily in the presence of air. Atmospheric oxygen has a retarding effect on the free radical polymerization mechanisms by which these compositions cure. After curing in the presence of air, the undersurface of the film may be tough and strong, but the surface is tacky and susceptible to attack by solvents.

One method for overcoming this problem is the mechanical exclusion of oxygen from the composition either by performing the application and cure in the presence of an inert atmosphere such as nitrogen or more practically by adding barrier substances such as paraffin wax to the formulation. The wax exudes to the surface of the coating or article as the cure progresses. After the cure the wax must be removed, for example, by sanding and polishing. The use of wax has many disadvantages. One disadvantage is the necessity of the sanding and polishing operations. In the case of a coating, the wax also migrates to the interface of the substrate and the coating, weakening the bond therebetween. The surface of the coating is often unattractive due to the exudation of the wax to the surface, and even after the sanding and polishing the surface may be defaced by delayed exudation of the wax.

More recently, attempts have been made to "build" into the system the capacity to cure even in the presence of atmospheric oxygen. One such system makes the use of tetrahydrophthalic anhydride (4-cyclohexene-1,2-dicarboxylic anhydride) as the essential ingredient in the polyester. Depending on the formulation, the coating from this polyester and styrene plus other ingredients such as free radical catalysts and driers allowed the coatings to dry in about 3 to 5 hours at room temperature.

While drying times of from 3 to 5 hours at room temperature were useful for some purposes, they still detracted from and prevented the practical and widespread use of these compositions in many areas. Thus, there is a presently existing need for a polyester and coating compositions thereof having short and more practical drying times, such as about two hours or less at room temperature, and in the order of about 15 minutes at moderately higher temperatures, such as 140° F.

Therefore, it is one object of the present invention to provide polymerizable compositions having rapid drying rates in the presence of atmospheric oxygen at ambient temperatures.

It is another object of this invention to provide polymerizable compositions which can be rapidly cured at ambient temperatures and at moderately increased temperatures while exposed to air or oxygen without exhibiting any under- or uncured, tacky, exposed surfaces.

It is a further object of this invention to provide polyesters having the above described properties and which provide exceedingly flexible films when coated onto a substrate.

These and other objects and advantages of the present invention will be apparent from the ensuing description.

It has now been discovered that compositions and particularly coating compositions having curing times of about two hours at ambient temperatures and in the order of 15 minutes or less at above about 140° F., can be prepared by the use of the new linear polyesters of the present invention. By ambient temperatures, normal room temperatures are intended. This short drying or cure time permits the use of the new compositions in numerous applications wherein exceedingly short drying times at ambient temperatures are necessary. In addition, the compositions of the present invention are light in color and have excellent flow and leveling properties. The coating compositions of the present invention have excellent hardness, often achieving essentially maximum hardness in approximately 2–3 hours; have excellent gloss; are resistant to marring and scratching; are exceedingly flexible in the form of thin films; and are also resistant to many solvents and other chemicals.

Among the numerous applications in which the coating compositions containing the polyester of the present invention can be utilized are as coatings on a large number of substrates such as wood, metal, paper, plastics, pressed wood products, concrete blocks and the like.

The novel and unexpected properties of the compositions described herein result from the use of the linear polyester of this invention which comprises the adduct of trans-piperylene, and maleic acid or its anhydride; isophthalic acid; an unsaturated dicarboxylic compound selected from the group consisting of maleic acid, maleic anhydride and fumaric acid; and a glycol.

The adduct of trans-piperylene and maleic anhydride, i.e. cis-3-methyl-4-cyclohexene-cis,cis-1,2-dicarboxylic anhydride, M.P. 63–65° C. has been found to impart into polyesters properties, particularly rapid drying rate, not only not found in other materials used for this purpose but also not obtained by the use of the three stereo isomers of this compound. This critical material will hereinafter be identified as Beta-PMAA. The three stereoisomers of Beta-PMAA have been reported in "The Diels-Alder Reactions of the Piperylene Isomers With Maleic Anhydride and Fumaric Acid" by David Craig, vol. 72, J.A.C.S., pp. 1678–1681, April 1950, and are as follows:
Trans-3-methyl-4-cyclohexene-cis,cis-1,2-carboxylic anhydride, M.P. 41° C. hereinafter referred to as Alpha-PMAA.

Cis-3-methyl-4-cyclohexene-cis,trans - 1,2-dicarboxylic anhydride, M.P. 133° C. hereinafter referred to as Gamma-PMAA.

Trans - 3 - methyl - 4 - cyclohexene-cis,trans-1,2-dicarboxylic anhydride, M.P. 120–121° C. hereinafter referred to as Delta-PMAA.

These four stereoisomers have the following structural formulas:

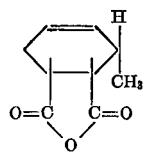

Beta-PMAA (I)

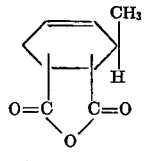

Alpha-PMAA (II)

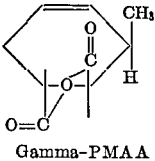

Gamma-PMAA (III)

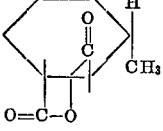

(IV)

The preparation of the adduct of trans-piperylene and maleic anhydride useful in the polyesters can be carried out by the following procedure. Maleic anhydride and a small amount of an inert aromatic hydrocarbon solvent (about 10 to 30% by weight based on the maleic anhydride), such as toluene or xylene, are charged into a suitable reaction vessel and are heated until the mixture becomes homogeneous. At least an equimolar amount of trans-piperylene is then slowly added to the reaction vessel with vigorous stirring and sufficient cooling to maintain the reaction temperature between about 40 and about 80° C. After the addition is completed further stirring and maintaining of the temperature for a period of up to about 3 hours can be desirable to insure the completion of the reaction. After this time the adduct of trans-piperylene and maleic anhydride can be recovered in excellent yields and high purity as a white solid having a melting point of 63 to 65° C. upon distillation of the reaction products under reduced pressure.

The beta isomer is thermodynamically less stable than certain of its stereoisomers. Consequently, care must be taken during distillation so as to prevent undesired isomerization of its carboxyl groups or rearrangement of its unsaturation. In particular, during distillation the system must be kept free of acids, bases and transition metal salts.

It is surprising and unexpected that the adduct heretofore described provides the properties described above, particularly the rapid drying rate. Adducts of similar structure, such as tetrahydrophthalic anhydride (4-cyclohexene-1,2-dicarboxylic anhydride):

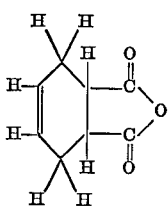

(V)

when incorporated into a polymerizable mixture of a polyester and polymerizable monomer, provide a drying time of about 4½ hours or more at ambient temperatures; while the adduct of isoprene and maleic anhydride (4-methyl-4-cyclohexene-1,2-dicarboxylic anhydride):

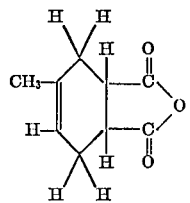

(VI)

has been found in a similar mixture to give a drying time of at best 5 hours or more at ambient temperatures. Drying time as used above, is the period after application that a ball of cotton fibers pressed onto the film can be brushed off the film readily, hereinafter called the "press free time." Moreover, by chemically shifting the double bond in the cyclohexene ring of Beta-PMAA and its acid to any of the other positions, the drying time of polymerizable compositions prepared therefrom is substantially lengthened. Thus it is unexpected that the use of the adduct of this invention, the Diels-Alder adduct of trans-piperylene and maleic acid or its anhydride in the polyester provides properties not obtainable with closely related compounds.

The components which comprise the polyester of this invention must be present therein in certain molar ratios in order to impart the desirable and rapid drying times to curable polyester compositions. Thus, the linear polyester of the present invention comprises from about 10 to about 35 mole percent of the adducts hereinabove described, from about 5 to about 35 mole percent of isophthalic acid, from about 10 to about 35 mole percent of an unsaturated dicarboxylic compound selected from the group consisting of maleic acid, maleic anhydride and fumaric acid and from about 50 to about 70 mole percent glycol.

In a preferred embodiment of this invention the polyester comprises from about 10 to about 30 mole percent of the adduct, from about 15 to about 30 mole percent of isophthalic acid, about 10 to 25 mole percent of the unsaturated dicarboxylic compound, and from about 50 to about 60 mole percent glycol. It is preferred to use an excess of glycol such as from about 5 to about 15 percent excess of the equimolar amount of dicarboxylic component.

When molar ratios other than those defined above are used the air drying and other properties of the resulting polyester degenerate rapidly.

The linear polyester of the present invention can also include one or more diacid, anhydride or other ester forming derivatives of dicarboxylic acids; these compounds being selected from the group consisting of aliphatic, cycloaliphatic and aromatic dicarboxylic acids and anhydrides. These compounds can be unsubstituted or substituted wherein the substituents are substantially inert to polymerization, such as halogen, nitro, cyano or ether, containing up to ten carbon atoms. Exemplary of suitable acids and anhydrides are chlorendic, phthalic, carbic, hydrogenated carbic, succinic, adipic and tetrachloro and tetrabromobenzene dicarboxylic acids. These compounds can comprise from about one to about 60 mole percent of the total dicarboxylic component used in making the essentially linear polyester; the amount of glycol being at least equimolar with the total moles of the adduct, unsaturated polycarboxylic compound and diacid or anhydride compounds.

Air-drying, fire retardant coatings and articles can be prepared by the use of these halogenated dicarboxylic compounds, as well as by the use of phosphorus compounds, in the polyesters of the present invention using techniques known to the art. Where fire retardant coatings or articles are desired the polymerizable mixture should contain at least 6% bromine, at least 12.5% chlorine or at least 3.5% phosphorus, preferably contributed to the mixture by one or more of the above halogen containing compounds, particularly a compound selected from the group consisting of chlorendic anhydride, chlorendic acid, endic anhydride, tetrachlorophthalic anhydride, tetrachlorophthalic acid, tetrachloroterephthalic acid, tetrabromophthalic anhydride, tetrabromophthalic acid and tetrabromoterephthalic acid.

Glycol is required in the linear polyester of the present invention, and one glycol or a mixture of several glycols can be used. Examples of suitable glycols are ethylene glycol, di-, tri-, tetra-, and higher -ethylene glycols, 1,2-propylene glycol, trimethylene glycol, polypropylene glycol, dipropylene glycol, 2,2-dimethyl-1,3-propane-diol, neopentyl glycol, 1,3-butylene glycol, and the like.

The linear polyester of the present invention can be prepared readily using one of the standard procedures known to the art such as the fusion cook or solvent methods. For example the ingredients can be combined with a quantity of an inert solvent such as xylene and heated to reflux in a nitrogen atmosphere. The water formed in the reaction is azeotroped with the inert solvent and removed by means known to the art. The inert solvent remaining in the reaction mixture at or near the end of the reaction can be removed by heating, by sparging with an inert gas or by the application of vacuum. The reaction is preferably continued until a low acid number, such as about 40 or less, and more preferably about 35 or less, is obtained. Although the resulting polyester can be isolated as such, it is preferred to prepare the composition in the form in which the polyester is to be used, and transport or store the compositions in that form.

A useful composition of the polyester of the present invention is a liquid, hardenable polymerizable mixture comprising the said polyester and at least one monomeric ethylene derivative copolymerizable by free radical addition polymerization with the unsaturation in the polyester. Monomeric ethylene derivatives copolymerizable with unsaturation in polyesters via free radical addition polymerization and their use are known to the art and are exemplified by those of the styrene, vinyl ester and acrylate type. The styrene type ethylene derivatives can be described by the following structural formula:

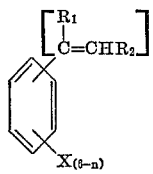

wherein $R_1$ and $R_2$ are independently selected from the group consisting of hydrogen and alkyl; $n$ is an integer greater than zero and less than six, preferably from one to two; and each X is independently selected from the group consisting of hydrogen, alkyl and halogen. The acrylic monomers can be described by the following structural formula

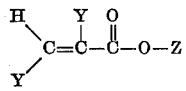

wherein Y and Z are independently selected from the group consisting of hydrogen and alkyl. The alkyl groups in the above formulas preferably contain from one to ten carbon atoms.

The preferred ethylene derivatives for copolymerization with the polyester are styrene, vinyl toluenes, chlorostyrenes, vinyl acetate, vinyl benzoate, methyl acrylate, ethyl acrylate, methyl methacrylate, butyl acrylate and a mixture of styrene and methyl methacrylate.

Other ethylene derivatives can be used in place of or with those described above. Exemplary of these are: diacetone acrylamide, alpha unsaturated vinyl ketones such as vinyl methyl ketone, alpha unsaturated vinyl sulfones and divinyl sulfone; vinyl esters of saturated and unsaturated mono- and polycarboxylic acids such as vinyl propionate and succinic acid divinyl esters; N-vinyl lactams such as N-vinyl pyrrolidone and N-vinyl caprolactam; and vinyl esters of mono- and polyhydro compounds such as isobutyl vinyl ether and butane diol-1,4-divinyl ether.

The polymerizable mixture comprises from about 20 to about 80% by weight of the polyester and from about 20 to about 80% by weight of the ethylene derivatives or ethylene derivative-acrylate mixture.

The polymerizable mixtures may be stabilized by adding the usual polymerization inhibitors to prevent gelation, and increase the storage or shelf life of the mixture. Suitable inhibitors are for example mono- and polyhydric phenols such as hydroquinone, benzoquinone, resorcinol, pyrocatechol and the like. Only a small amount of inhibitor is required such as from about 0.005 to about 0.1% based on the weight of the mixture. It is preferable to add from about 0.01 to about 0.03% inhibitor.

The polymerizable mixtures described above can be stored for long periods of time without appreciable polymerization. In order to utilize the mixtures, polymerization is initiated by the addition of catalysts, particularly the peroxide and hydroperoxide catalysts. Examples of especially suitable peroxide and hydroperoxide catalysts are methyl ethyl ketone peroxides, cyclohexanone peroxide, cumene hydroperoxide, tertiary-butyl hydroperoxide, benzoyl peroxide, lauroyl peroxide, tertiary-butyl perbenzoate, tertiary-butyl permaleate, and ditertiary-butyl peroxide. Other catalysts which can be used to initiate or accelerate the polymerization reaction are the azo compounds such as azo-bis-isobutyronitrile and azo-bis-isobutyric acid dibutyl ester and redox systems consisting of a peroxide and a tertiary amine. A small amount of catalyst such as for example betyeen 0.2% and 3% based on the weight of the polymerizable mixture has been found to be sufficient. It is preferable to add the catalyst immediately before application of the mixture. Where the mixture is to be sprayed as a coating, it is preferable to add the catalyst to the mixture in the mixing chamber of the spray gun.

In conjunction with the catalysts, an accelerator or promoter, such as the metal driers commonly used in polyester solutions can be incorporated into the polyester solution to enhance curing, i.e. crosslinking, at ambient temperatures. The naphthenates of the metals iron, cobalt, nickel, manganese, chromium, lead, vanadium, zinc, zirconium, cerium, aluminum and calcium are especially suitable. In addition the resinates, octoates or linoleates or metal compounds soluble in the polymerizable mixture may be used. Often it is desirable to add mixtures of the various driers to obtain particularly properties. These driers are normally used in amounts between about 0.01 and 1.0% of the metal based on the weight of the polymerizable mixture.

The polymerizable mixtures described above are particularly useful in coating substrates, such as those heretofore described, in the presence of oxygen, particularly in the presence of air, with a coating having a hard, dry surface within less than about 2 hours. Coating as described above can be accomplished by applying to the substrate the liquid, hardenable polymerizable mixture and a free radical catalyst therefore at room temperature and maintaining the coated substrate at room temperature until the surface of the coating is dry. The polymerizable mixture also can be used to coat a substrate in the presence of oxygen with a coating having a hard, dry surface within about 15 minutes by applying the mixture and free radical catalyst therefore as above, and then heating the coated substrate to a temperature above about 50° C., and preferably below about 150° C. for a maximum time of about 15 minutes until the surface of the coating is dry.

The preparation and properties of the linear polyester and the polymerizable mixtures of the present invention are illustrated in the following examples. The examples represent typical formulations and conditions and it will be readily apparent to those skilled in the art that other formulations and conditions can readily be used.

EXAMPLE 1

A 5 liter three-necked flask was equipped with a dropping funnel, stirrer, thermometer and a Snyder column connected to a Dean-Stark trap and Friedrich condenser. Both the dropping funnel and the condenser were connected to nitrogen lines allowing the maintenance of an inert atmosphere over the reaction mixture. The reaction flask was charged with Beta-PMAA (2.5 mols– 415.4 g.) isophthalic acid (25. mols; 415.5 g.) and diethylene glycol (10.0 mols; 1061.2 g.). The reaction flask was flushed with nitrogen and the reaction mixture was heated to a temperature of about 210° C. The reaction temperature was maintained by the addition of toluene and adjusting the amount of refluxing toluene. After five hours at 210° C. the reaction mixture was cooled to approximately 60° C. and sampled for acid value. An acid value of 19.1 was observed. Fumaric acid (5.0 mols; 580.4 g.) was then charged to the reaction flask and the mixture was heated to 195° C. After about 4 hours at this temperature the reaction mixture was stripped of toluene, unreacted starting materials and half esters. The reaction mixture was then cooled to yield the desired polyester having an acid value of 30.3. After this time inhibitors (hydroquinone 0.35 gram and benzoquinone 0.35 gram) were added to the polyester. Styrene monomer (1369.5 grams) was then added to the polyester at 100° C. to dilute the polyester to 60 percent by weight solid content. The resulting product was then cooled and stirred until a polymerizable mixture of the polyester and styrene was obtained.

EXAMPLE 2

A 5 liter three-necked flask is equipped with a dropping funnel, stirrer, thermometer and a snyder column connected to a Dean-Stark trap and Friedrich condenser. Both the dropping funnel and the condenser are connected to nitrogen lines allowing the maintenance of a inert atmosphere over the reaction mixture. The reaction flask is charged with Beta-PMAA (2.0 mols; 330 grams) isophthalic acid (1.0 mol; 166 grams) and diethylene glycol (10.0 mols; 1061 g.). The reaction flask is purged with nitrogen and the reaction mixture is heated to a temperature of about 210° C. The reaction temperature is maintained by the addition of toluene and by adjusting the amount of refluxing toluene. After about 5 hours at 210° C. the reaction mixture is cooled to about 60° C. Maleic acid (7 mols; 805 g.) is then charged to the reaction flask and mixture is heated to a temperature of about 195° C. After about 4 hours at this temperature the reaction mixture is stripped of toluene, unreacted starting materials, half esters and low molecular weight products. The reaction mixture is then cooled to yield the desired polyester. After this time hydroquinone (0.35 g.) and benzoquinone (0.35 g.) are added to the polyester. Butyl acrylate monomer (1400 g.) is then added to the polyester at 100° C. with stirring to provide a homogeneous polymerizable mixture of the polyester and the butyl acrylate.

The polymerizable mixtures of this invention are used as a coating as follows: A portion of the polymerizable mixture (20 g.) is placed into a aluminum dish. A 60% solution of methyl ethyl ketone peroxide in dimethyl phthalate (0.3 g.) and cobalt naphthenate containing 6% cobalt (0.14 g.) are stirred into the polymerizable mixture. The mixture is drawn onto a glass plate with a film applicator of the desired thickness.

The lint free time and press free time of various films were determined. The lint free time is the period after the application of the film at which cotton fibers dropped on the film can be blown off in accordance with the cotton fiber method, ASTM D-1640. Press free time has been previously defined.

Pencil hardness is determined by writing with pencils of various hardness over the film after the designated period of time and determining the pencil of greatest hardness which does not penetrate the film, the pencils being pointed with a flat end by a draftman's mechanical sharpener.

For the purpose of comparison, polyesters and polymerizable mixtures and films therefrom were prepared using in the aforedescribed procedures the adducts of Formulas V and VI, the adducts of isoprene and maleic acid and butadiene and maleic acid, as well as the stereoisomers of Beta-PMAA in place of the Beta-PMAA.

To further demonstrate the unexpected properties of the polyester of the present invention in affording unusually short drying times, a polyester was prepared from a mixture of adducts wherein the double bond of Beta-PMAA was shifted. A quantity of Beta-PMAA was subjected to an acid catalyzed rearrangement of its double bond using known procedures. The resulting material appeared to be a mixture of at least three components in addition to the starting material. This mixture was assigned the following composition based on gas chromatographic and nuclear magnetic resonance analyses: about 30% 3-methyl-1-cyclohexene - 1,2 - dicarboxylic anhydride, about 30% 3-methyl-2-cyclohexene - 1,2 - dicarboxylic anhydride, about 30% 3 - methyl - 3 - cyclohexene-1,2-dicarboxylic anhydride, and about 10% Beta-PMAA. A polyester, and a polymerizable mixture and film therefrom, were prepared from the mixture (Example 14) and from pure 3-methyl-cyclohexene-1,2-dicarboxylic anhydride (Example 13).

For the sake of brevity the following terms will hereinafter be identified as indicated: diethylene glycol propane will be identified as DEG, monoallyl ether of trimethylol propane will be identified as TMPME and the adducts of Formulas V and VI, as V and VI respectively.

| | Molar ratio | Final acid value | Press free time (min.) | Pencil hardness 1 hr. | Pencil hardness 24 hrs. |
|---|---|---|---|---|---|
| Example 3 | | 29.5 | 52 | 6 H [1] | 8 H [1] |
| Beta-PMAA | 0.25 | | | | |
| Isophthalic acid | 0.25 | | | | |
| Fumaric acid | 0.50 | | | | |
| DEG | 1.05 | | | | |
| Example 4 | | 22.3 | 70 | H | 3 H |
| Beta-PMAA | 0.25 | | | | |
| Isophthalic acid | 0.25 | | | | |
| Fumaric acid | 0.50 | | | | |
| DEG | 1.03 | | | | |
| Example 5 | | 27.5 | 125 | 2 H | 3 H |
| Beta-PMAA | 0.25 | | | | |
| Isophthalic acid | 0.25 | | | | |
| Fumaric acid | 0.50 | | | | |
| DEG | 1.00 | | | | |
| Example 6 | | 21.2 | 90 | 2 H | 2 H |
| Beta-PMAA | 0.25 | | | | |
| Isophthalic acid | 0.50 | | | | |
| Fumaric acid | 0.25 | | | | |
| DEG | 1.00 | | | | |
| Example 7 | | 21.3 | 310 | | 5 H |
| Alpha-PMAA | 0.34 | | | | |
| Fumaric acid | 0.79 | | | | |
| DEG | 1.20 | | | | |
| Example 8 | | 28.7 | 146 | 8 H | 8 H |
| Alpha-PMAA | 0.5 | | | | |
| Beta-PMAA | 0.08 | | | | |
| Fumaric acid | 1.40 | | | | |
| DEG | 2.10 | | | | |
| Example 9 | | | 225 | 2 H | 6 H |
| Alpha-PMAA | 0.15 | | | | |
| Beta-PMAA | 0.15 | | | | |
| Fumaric acid | 0.70 | | | | |
| DEG | 1.05 | | | | |
| Example 10 | | 26.9 | 344 | H | 6 H |
| Gamma-PMAA | 0.02 | | | | |
| Delta-PMAA | 0.23 | | | | |
| Fumaric acid | 0.58 | | | | |
| DEG | 0.89 | | | | |
| Example 11 | | 30.8 | 255 | 2 H | 6 H |
| Gamma-PMAA | 0.03 | | | | |
| Delta-PMAA | 0.24 | | | | |
| Fumaric acid | 0.63 | | | | |
| DEG | 1.05 | | | | |
| Example 12 | | (²) | | | |
| Gamma-PMAA | 0.09 | | | | |
| Delta-PMAA | 0.01 | | | | |
| Fumaric acid | 0.25 | | | | |
| DEG | 0.38 | | | | |

See footnotes at end of table.

TABLE—Continued

| | Molar ratio | Final acid value | Press free time (min.) | Pencil hardness 1 hr. | Pencil hardness 24 hrs. |
|---|---|---|---|---|---|
| Example 13 | | 32.7 | 252 | 8 H | 9 H |
| 3-methyl-3-cyclohexene-1,2-dicarboxylic anhydride | 0.86 | | | | |
| Fumaric acid | 0.86 | | | | |
| DEG | 1.75 | | | | |
| Example 14 | | <40 | (²) | | |
| Mixture obtained by rearranging Delta-PMAA | 0.26 | | | | |
| Fumaric acid | 0.75 | | | | |
| DEG | 1.05 | | | | |
| Example 15 | | <47 | 300 | | 4 H |
| Adduct of Formula V | 0.5 | | | | |
| Fumaric acid | 1.5 | | | | |
| DEG | 2.1 | | | | |
| Example 16 | | <38 | 300 | | 3 H |
| Adduct of Formula VI | 0.5 | | | | |
| Fumaric acid | 1.5 | | | | |
| DEG | 2.1 | | | | |

[1] A film thickness of 1.5 mil was used in this example. The remaining examples utilized a 15 ml film thickness.
[2] No cure.

In another series of experiments polyesters prepared from Beta-PMAA, isophthalic acid, fumaric acid and diethylene glycol and prepared from Beta-PMAA, isophthalic acid, maleic anhydride and diethylene glycol were compared with identical polyesters except wherein the Beta-PMAA was replaced with Alpha-PMAA, isoprene maleic anhydride adduct and tetrahydrophthalic anhydride. The properties of these polyesters is shown in the following examples. In these experiments both 1.5 mil and 15 mil films were compared.

| | Molar ratio | Press free time (min.) 1.5 mil | Press free time (min.) 15 mil | Pencil hardness 1 hr. 1.5 mil | Pencil hardness 1 hr. 15 mil | Pencil hardness 24 hrs. 1.5 mil | Pencil hardness 24 hrs. 15 mil |
|---|---|---|---|---|---|---|---|
| Example 17 | | 55 | 60 | 3H | 2H | 7H | 5H |
| Beta-PMAA | 0.25 | | | | | | |
| Isophthalic acid | 0.25 | | | | | | |
| Fumaric acid | 0.50 | | | | | | |
| DEG | 1.03 | | | | | | |
| Example 18 | | 75 | 80 | 4H | 2H | 6H | 3H |
| Beta-PMA | 0.25 | | | | | | |
| Isophthalic acid | 0.25 | | | | | | |
| Maleic anhydride | 0.50 | | | | | | |
| DEG | 1.03 | | | | | | |
| Example 19 | | 330 | 330 | 3H | B | 5H | 2H |
| α-PMAA | 0.25 | | | | | | |
| Isophthalic acid | 0.25 | | | | | | |
| Fumaric acid | 0.50 | | | | | | |
| DEG | 1.03 | | | | | | |
| Example 20 | | 330 | 330 | 3H | B | 6H | 2H |
| α-PMAA | 0.25 | | | | | | |
| Isophthalic acid | 0.25 | | | | | | |
| Maleic anhydride | 0.50 | | | | | | |
| DEG | 1.03 | | | | | | |
| Example 21 | | 100 | 110 | 5H | 3H | 6H | 3H |
| IMAA [1] | 0.25 | | | | | | |
| Isophthalic acid | 0.25 | | | | | | |
| Fumaric acid | 0.50 | | | | | | |
| DEG | 1.03 | | | | | | |
| Example 22 | | 130 | 130 | 5H | 2H | 6H | 2H |
| IMAA | 0.25 | | | | | | |
| Isophthalic acid | 0.25 | | | | | | |
| Maleic anhydride | 0.50 | | | | | | |
| DEG | 1.03 | | | | | | |
| Example 23 | | 120 | 130 | 5H | 2H | 7H | 2H |
| THPA [2] | 0.25 | | | | | | |
| Isophthalic acid | 0.25 | | | | | | |
| Fumaric acid | 0.50 | | | | | | |
| DEG | 1.03 | | | | | | |
| Example 24 | | 190 | 190 | 5H | 3H | 6H | 3H |
| THPA | 0.25 | | | | | | |
| Isophthalic acid | 0.25 | | | | | | |
| Maleic anhydride | 0.50 | | | | | | |
| DEG | 1.03 | | | | | | |

[1] Isoprene maleic anhydride adduct.
[2] Tetrahydrophthalic anhydride.

The foregoing examples demonstrate the properties of the polyester of the present invention. It can be seen therefrom that the instant polyesters impart into polyesters drying times not obtained in polyesters prepared from structurally similar components.

Often a desirable balance of mechanical, physical and chemical properties, making the compositions of the present invention particularly useful in certain applications, can be obtained by substituting at least part of the ingredients of the polyesters of this invention with ingredients that have essentially the same function. It is to be understood that in order to achieve a satisfactory drying rate in these modified polyesters the adduct of maleic acid or anhydride and trans-piperylene is present in the proportion previously described.

Polyesters and polymerizable mixtures and films prepared therefrom of varied properties can also be obtained by varying the temperature at which the polyester is prepared, and by performing the reaction to obtain a polyester of higher or lower acid number.

We claim:
1. A linear polyester comprising (A) from about 10 to about 35 mole percent of cis-3-methyl-4-cyclohexene-cis,cis-1,2-dicarboxylic anhydride having a melting point of about 63 to 65° C., or its acid; (B) from about 5 to about 35 mole percent of isophthalic acid; (C) from about 10 to about 35 mole percent of an unsaturated dicarboxylic compound selected from the group consisting of maleic acid, maleic anhydride and fumaric acid; and (D) from about 50 to about 70 mole percent glycol.

2. The polyester of claim 1 wherein the glycol is selected from the group consisting of ethylene glycol, diethylene glycol, triethylene glycol, polyethylene glycol, 1,2-propylene glycol, trimethylene glycol, dipropylene glycol, polypropylene glycol, 2,2-dimethyl-1,3-propane diol, 1,3-butylene glycol and mixtures thereof.

3. The polyester of claim 1 wherein the glycol is diethylene glycol.

4. The polyester of claim 1 wherein the glycol is 1,2-propylene glycol.

5. The polyester of claim 1 wherein the glycol is 1,3-butylene glycol.

6. A liquid, hardenable polymerizable mixture comprising the polyester of claim 1 and at least one monomeric ethylene derivative selected from the group consisting of

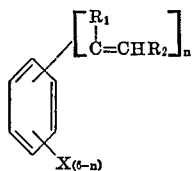

wherein $R_1$ and $R_2$ are independently selected from the group consisting of hydrogen and alkyl; $n$ is an integer greater than zero and less than six; and each X is independently selected from the group consisting of hydrogen, alkyl from one to ten carbon atoms and halogen;

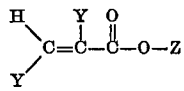

wherein Y and Z are independently selected from the group consisting of hydrogen and alkyl of from one to ten carbon atoms; vinyl acetate; and vinyl benzoate.

7. The composition of claim 6 wherein the ethylene derivative is selected from the group consisting of styrene, vinyl toluene, chlorostyrene, vinyl acetate, vinyl benzoate, methyl acrylate, ethyl acrylate, methyl methacrylate, butyl acrylate and mixtures thereof.

8. The composition of claim 6 wherein the ethylene derivative is styrene.

9. The composition of claim 6 wherein the ethylene derivative is butyl acrylate.

References Cited

UNITED STATES PATENTS 3,663,658    5/1972    Scardiglia et al.

OTHER REFERENCES

Boenig: "Unsaturated Polyesters," Elsevier, New York, 1964, pp. 100–01.

MELVIN GOLDSTEIN, Primary Examiner

U.S. Cl. X.R.

117—132 B, 138.8 A, 148, 155 UA; 260—75 A, UA, H, 861, 863, 864, 868, 869